United States Patent [19]

Mohlere

[11] 4,422,027
[45] Dec. 20, 1983

[54] LINEAR MOTOR CONTROLLER

[75] Inventor: Richard D. Mohlere, Huntsville, Ala.

[73] Assignee: The United States of America as represented by the Secretary of the Army, Washington, D.C.

[21] Appl. No.: 244,438

[22] Filed: Mar. 16, 1981

[51] Int. Cl.³ ............................................. G05B 11/00
[52] U.S. Cl. ..................................... 318/687; 318/625
[58] Field of Search ............... 318/587, 625, 38, 568, 318/687

[56] References Cited

U.S. PATENT DOCUMENTS

| | | | |
|---|---|---|---|
| 3,763,360 | 10/1973 | Nishimura et al. | 318/625 X |
| 4,031,443 | 6/1977 | Droux | 318/687 X |
| 4,068,154 | 1/1978 | Cecil | 318/568 |
| 4,230,978 | 10/1980 | Gardella et al. | 318/687 |
| 4,257,103 | 3/1981 | Suzuki | 318/625 X |
| 4,258,425 | 3/1981 | Ramsey et al. | 318/568 |

OTHER PUBLICATIONS

Understanding Solid State Electronics, Texas Instrument Company, pp. 61–63, 1972.

Primary Examiner—B. Dobeck
Attorney, Agent, or Firm—Robert P. Gibson; Anthony T. Lane; Robert C. Sims

[57] ABSTRACT

The controller interfaces up to two linear motors to either a manual control panel or a two channel computer. The control commands can emanate from either the computer (for both motors) or a combination of the computer (for one motor) and the linear motor (solenoid) with a lateral throw of one inch. In one mode, the controller will slew the armature back and forth at a uniform rate. In another mode, the controller will slew the armature at a commanded rate and then automatically modify the rate so that the armature will comply with periodic position commands from the computer. In a further mode, the controller will retract the armature to an initial position, clear the counters, and reset all logic. At all times, the position of either motors' armature can be read visually from the control panel and both motors' armature positions can be read from the respective computer channels.

1 Claim, 4 Drawing Figures

LINEAR MOTOR CONTROLLER

DEDICATORY CLAUSE

The invention described herein may be manufactured, used, and licensed by or for the Government for governmental purposes without the payment to me of any royalties thereon.

BACKGROUND OF THE INVENTION

Devices similar to the present type of mechanism are found in disk drives with movable heads. The linear actuator in the disk drives (sometimes called a "voice coil" movement) performs the same type basic type of control. However, the disk drive actuator was found to be unsatisfactory because the armature movement is not uniform. Rather the speed of the armature is proportional to its distance from the "target" location. Also, there is no capability for rate mode or for rate with position correction. These disadvantages have been overcome with the use of the Linear Motor Controller.

The present configuration is set up to position a quartz crystal rod under a laser beam with high positional accuracy. The accuracy obtainable is dependent solely upon an opaque graticule marking on some glass slides. As the graticule interrupts a light beam passing through the glass, optical detectors count either up or down, depending on the direction of travel of the rod. In the positional mode, the graticules are counted and used to put the rod in a position desired by the operator. In the rate mode, the speed of the rod is adjusted to a predetermined rate. In the rate-with-position-correction mode, the rate is continually updated and corrected to insure that the rod is hitting certain positional points exactly when a computer determines that these points should be hit.

Prior linear controllers, like the aforementioned disk head controller, use only a positional mode with proportional control. This means that as the head gets very close to the intended target, the speed of the head toward the target diminishes. There is no rate or rate-with-position-correction mode in these controllers.

The present device can be used in any mechanical control application where position or rate of travel is to be controlled. This includes gun traversing mechanisms, automatic welding machines, wire wrap machines, disk head controller, automobile speed controllers, automatic drafting machines, automated machine tool applications, and any other application where the linear position of a mechanical rod or beam is important. This device is very independent of the end product which it is controlling. As long as the controlled device has an input for changing the position of the device and a means of attaching a graticule position detector, this Linear Motor Controller (LMC) can control the device. This LMC can be used manually or under computer control.

SUMMARY OF THE INVENTION

The present invention can interface up to two linear motors to either a manual control panel or a two channel computer. The control commands can emanate from either the computer (for both motors) or a combination of the computer (for one motor) and the manual control panel (for the other motor). The object of control is linear motor (solenoid) with a lateral throw of one inch. The controller will position any portion of the motor's armature under a laser beam with an accuracy of 0.5 thousandths of an inch. In another mode, the controller will slew the armature back and forth at a uniform rate. In a third mode, the controller will slew the armature at a commanded rate and then automatically modify the rate so that the armature will comply with periodic position commands from the computer. In a fourth mode, the controller will retract the armature to an initial position, clear the counters, and reset all logic. At all times, the position of either motors' armature can be read visually from the control panel and both motors' armature positions can be read from the respective computer channels.

DESCRIPTION OF THE BEST MODE AND PREFERRED EMBODIMENT

Figure 1:
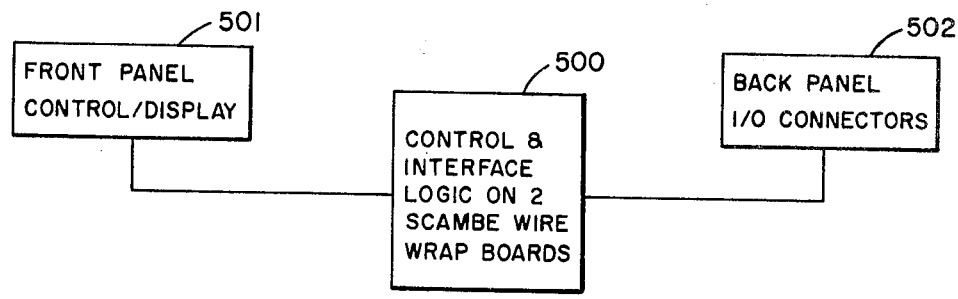
FIG. 1 is a block diagram illustrating connections of the panels and the interfacing of the present invention.

FIG. 1 shows that the basic invention consists of two each six zone SCAMBE wire wrap boards 500 which can be mounted in a standard 19-inch rach mounted drawer, not shown. In addition to the two SCAMBE wire wrap boards, there is a front control panel 501 for manual operation and display purposes and a back connector panel 502 for housing the input/output connectors and the power supply input.

Figure 2:
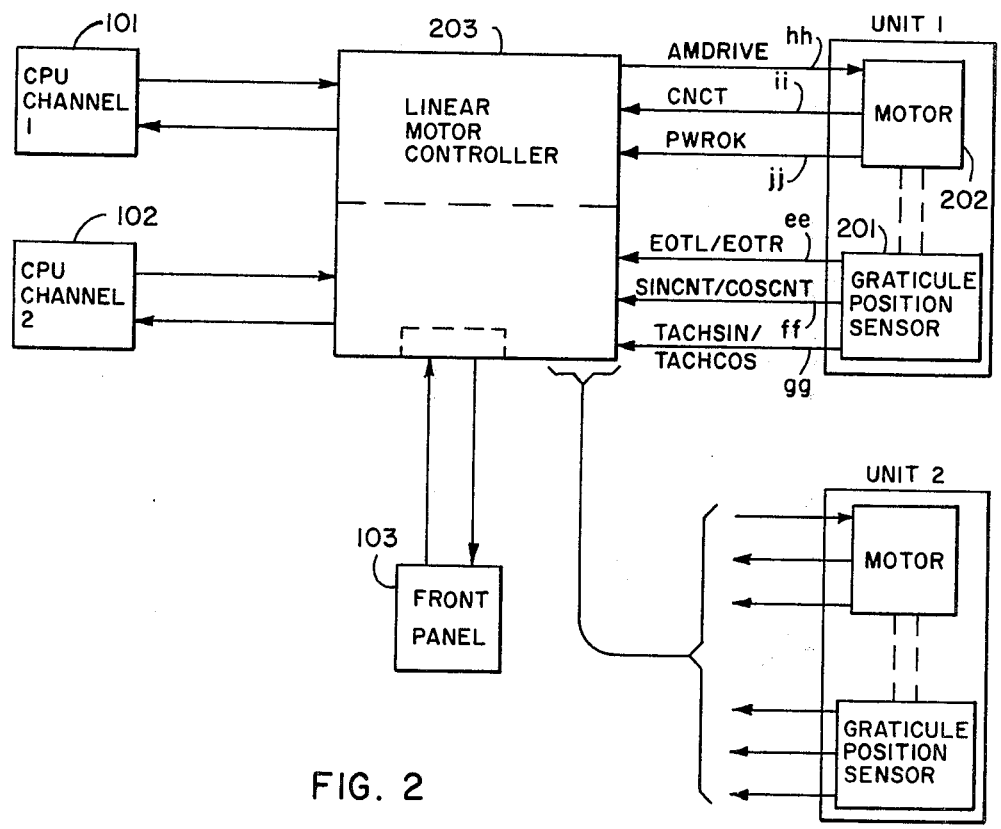
FIG. 2 is an overall diagram of the present invention.

The controller can handle two motors as is shown in FIG. 2. Each of the two shown control computer (CPU) channels 101 and 100 controls 1 channel. The Front Panel 103 can take the place of either of the two CPU channels. This allows manual control by an operator. The Motor(s) get driven by the AMDRIVE signal hh. The Graticule Position Sensor 201 of unit 1 attached to the motor 202 sends back indicating signals ee, ff and gg from which the controller 203 computes position, direction, and velocity information. Unit 2 acts in the same manner as unit 1.

Figure 4:
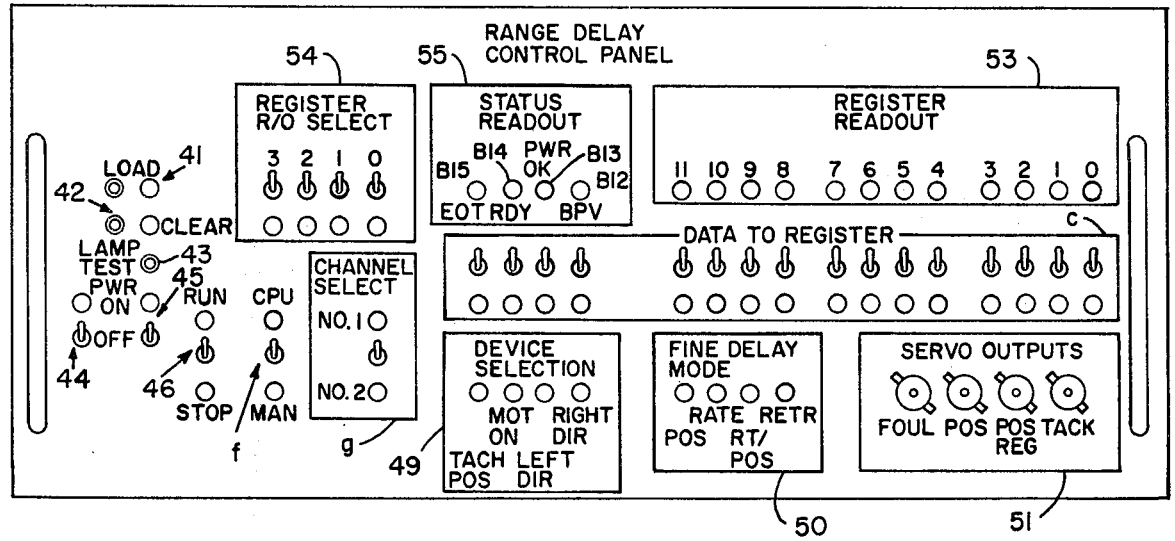
FIG. 4 is an illustration of the range delay control panel.
Figure 3:
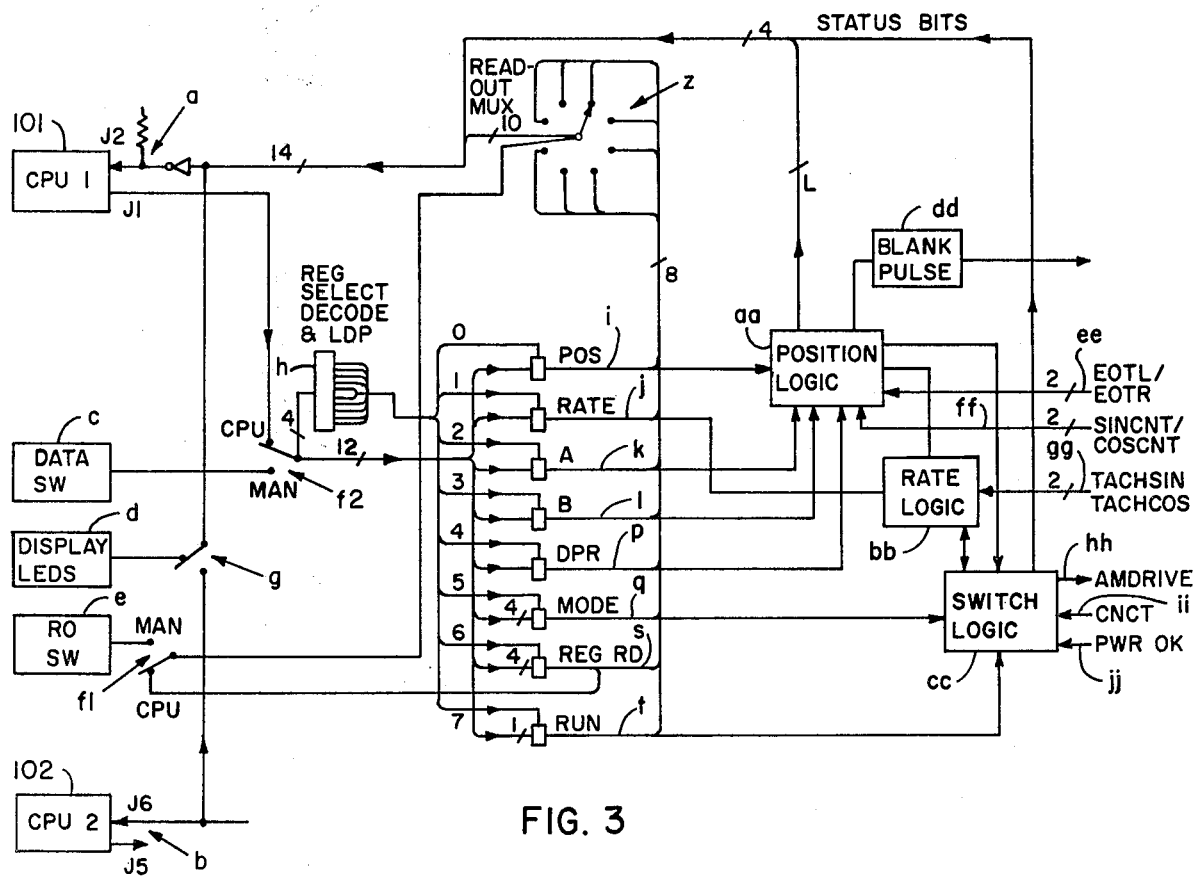
FIG. 3 is a detailed illustration of the controller of the present invention.

Referring to the detailed showing of the invention shown in FIGS. 3 and 4 connectors a to control computer #1 are labelled "J1 and J2", while connectors b to control computer #2 are labelled "J5 and J6", the output from J5 is to be connected to a duplicated controller, not shown.

The data input switches c for manual control are connected to switch g. The output light emitting diodes d are used in manually observing the action of the controller. The switches e determine which of the internal registers of the controller actually gets output to the display LEDs.

Switches F1 and F2 are ganged together, and they determine whether the control is to be CPU or Manual mode. Switch g determines which of the two controllers is to be manually controlled and is labelled "½".

The decoder h decides which of the internal registers is to be loaded and connected to switch F2 so as to be inputted from either the CPU 1 or from the data SW.

Register i which stores the desired position of the motor armature is connected to feed position logic aa. All registers i–t can take the form of any of the well known registers.

Register j which stores the desired rate of travel of the armature is connected to the rate logic bb. Register k stores the position at which the armature has reached its right most desired limit. Register 1 stores the position at which the armature has reached its left most desired limit.

Attenuator control m controls an attenuator in a separate RF path. Register n controls an external delay extender kk. Register p has the current positional information for the motor armature. The mode of the controller is specified by loading the register q. An external four bit wide control is set by loading the "COARSE" register r.

The computer 101 chooses which of the internal registers is to be put on the computer's input lines by loading the register(s) labelled REG RD. The motor attached to the controller is set in motion by loading the "RUN" register t.

Interrupt generator x generates an interrupt to the controlling computer every second. A multiplexer z selects which register data is to appear as output to the computer or front panel.

The logic section aa labelled "POSITION LOGIC" manipulates the end of travel signals from the motor, the position pulses from the motor, the actual position of the motor, the desired left and right travel limits, the desired position information, the output to the Readout Mux, the controls to the Switch logic, and the controls to the Rate logics. The logic section bb labelled "RATE LOGIC" manipulates the motor's positional data output, the POSITION LOGIC section output, the RATE register data, and the SWITCH LOGIC data. The logic section cc labelled "SWITCH LOGIC" manipulates the MODE data, the RUN data, the Pwr OK signal, the analog output voltage to the motor, the status bits, Position Logic data, and Rate logic Data. The logic section dd labelled "BLANK PULSE" outputs a blanking pulse to the RF circuitry every time the armature reaches an end of travel and has to reverse direction. All of these logic circuits may take the form of any of the well known logic circuits without undue designing to make them fit the desired functions.

The End-of-Travel Left (EOTL) and End of Travel Right (EOTR) ee come from the motor 202 being controlled as sensed by sensor 201 and indicate when the armature has reached a preset mechanical stop. The SINCNT (sine count) and COSCNT (cosine count) ff are 2 pulse trains from the graticule motion transducer 201 attached to the armature of the linear motor 202. The TACHSIN (tachometer sine) and TACHCOS (tachometer cosine) gg inputs are identical to the SINCNT and COSCNT input.

The AMDRIVE (Analog Motor Drive) signal hh is the output of the controller to servo amplifiers, not shown, driving linear motor's 202 armature. The CNCT (connect) signal ii is a voltage level from the motor indicating that the cables are connected. The PWROK (power ok) signal kk is from the motor 202 indicating that all of the voltages in the motor are present.

The front panel controls are shown in FIG. 4. The LOAD pushbutton and LED 41 loads the register selected by the four most significant bits of the data switches 52 with the data specified by the least significant 12 data switches. CLEAR pushbutton and LED 42 clears all of the internal registers. LAMP TEST pushbutton 43 tests all front panel LEDs. A 5 V PWR ON/OFF switch 44 controls all logic 5 V power, while a 15 V PWR ON/OFF switch 45 controls 15 volt power to all analog circuits.

RUN/STOP switch 46 manually controls motor on/off status of controlled motor. The CPU/MAN switch f determines whether selected motor is controlled by computer or manually. CHANNEL SELECT g (No. 1/No. 2) determines which of the two motors is to be controlled by front panel.

The DEVICE SELECTION 49 display shows TACH POS led lit when motor rate is positive; MOT ON lit when power is applied to motor; LEFT DIR lit when motor armature traveling left, and RIGHT DIR lit when motor armature traveling right.

The FINE DELAY display 50 shows POS when in position mode; RATE when in rate mode; RT/POS when in rate with position correction mode and RETR when in retract mode.

A SERVO OUTPUTS section 51 outputs FOUL: A logic high (+5 V) when armature is outside of A and B limits; POS: An analog voltage proportional to the actual position points; POS REG: An analog voltage proportional to the desired position; and TACH: An analog voltage proportional to the rate of armature travel.

DATA TO REGISTER switches and LEDs c provides the manual input data to register which is selected to be loaded.

REGISTER READOUT LEDs 53 display the contents of the register selected for display. REGISTER R/O SELECTS 54 selects the register address to be output to the REGISTER READOUT display. The STATUS READOUT LEDs 55 are connected such that B15 indicates end of travel of armature. B14 indicates Ready (armature has reached desired position. B13 indicates "power OK" (all motor power supplies are functional). B12 indicates that the CPU has control of the motor.

Operational Cycles

A. RETRACT Mode (Manual Control of motor #1)

1. The front panel is initialized by setting the RUN switch 46 to STOP, the CPU/MAN switch f to MAN, the CHANNEL SELECT switch g to No. 1, turning on the 5 V and 15 V supplies 44 and 45, and pressing the CLEAR button 42.

2. The registers are initialized by loading from data switches c a rate value in the RATE register j and the RETRACT bit in the MOD register q.

3. The motor 202 is activated to its far left initial state by setting the RUN/STOP switch 46 in the RUN position. The motor armature will now slew to the left until the end-of-travel-left signal is activated. At this time the digital position register p (DPR) will be zeroed, the ready (RDY) status light B14 will light, and the motor will be shut off. The rate at which the armature slews to the left is determined by the setting in the RATE register j.

B. POSITION MODE—In this mode, the armature can be moved to any static position desired by the user. Position mode is initiated by using data switches c to place the desired position value in the POS register i and the desired rate of travel in the RATE register j. Setting the REGISTER R/O SELECT 54 switches so that the DPR is displayed allows the user to "see" the armature's progress toward the desired position. The proper sequence of operations for this mode of control follows:

1. Set Register R/O Select Switches 54 to display the DPR register p.
2. Set the travel rate in the RATE register j.
3. Set the desired position in the POSITION register i.
4. Set the mode to the POSITION mode in the MODE register q.

C. RATE MODE—In this mode, the armature will "saw" back and forth between two positional limits. The "A" limit is the lower of two counts and is as far left as the motor armature is to travel. The "B" switch is a higher count and represents the position at which the motor may not travel any further to the right. The proper sequence of controls for this mode follows:
1. Go through RETRACT mode.
2. Set the proper rate in the RATE register j.
3. Set the desired leftmost limit in the A Register k.
4. Set the desired rightmost limit in the B Register l.
5. Initialize the armature anywhere in between the A and B limits via the POSITION Mode q.
6. Go to RATE Mode by setting the MODE register q.

D. Rate with Position Correction Mode—This is a more sophisticated version of the rate mode. It is practical only in the computer controlled operation of the motor. This mode of control is used when a uniform rate of slewing is desired and when the computer periodically updates the controller by sending it a position which represents exactly where the armature should be at that particular time. If in fact the armature was lagging behind, the correction circuitry automatically adds to the rate command being output to the motor. This will speed the motor up. If the motor were ahead of its desired position, the correction circuitry automatically subtracts from the actual rate being output to the motor.

These specific circuitry interconnecting the panel of FIG. 4 with the controller of FIG. 1 is not shown. This has been done so as not to unduely complicate the disclosure of the present invention. Such connections are obviously design features well within the ability of one skilled in the art, and as such do not form a part of the inventive matter of the present disclosure.

I claim:

1. A motor controller device comprising a motor to be controlled; a position sensor associated with said motor such that the sensor will generate at its outputs, signals indicating the position and travel of said motor; a linear motor controller connected to drive said motor and connected to receive the signals from said position sensor; said linear motor controller having a plurality of registers which may be loaded with predetermined values so as to control various motions and rates of said motor; a panel control device having a plurality of data input switches which are connected to said registers for selectively inputting said predetermined value into selective ones of said registers for controlling movement of said motor; a second motor, a second position sensor associated with said second motor for indicating position and movement of said second motor; said second motor and said second position sensor being connected to said linear motor controller; further switching means on said panel control device for selecting which motor is to be controlled; first and second computer inputting devices; and additional switching means on said panel control device for selectively connecting the plurality of registers to one of said computer inputting devices or to said panel control device.

* * * * *